United States Patent [19]
Edelson et al.

[11] 4,247,068
[45] Jan. 27, 1981

[54] EXTENSIBLE SUPPORT APPARATUS

[75] Inventors: Leo Edelson, Marathon, Fla.; Trygve R. Oddsen, Northport; Gustav A. Oddsen, Locust Valley, both of N.Y.

[73] Assignee: G.L.R. Corporation, Westbury, N.Y.

[21] Appl. No.: 945,144

[22] Filed: Sep. 22, 1978

[51] Int. Cl.² ........................................... F16M 11/00
[52] U.S. Cl. ................... 248/162.1; 108/136
[58] Field of Search ............... 248/162, 162.1, 412, 248/411, 404; 108/158, 136; 403/384, 386

[56] References Cited

U.S. PATENT DOCUMENTS

| | | | |
|---|---|---|---|
| 689,855 | 12/1901 | Copeland | 248/412 X |
| 1,889,978 | 12/1932 | Dickey | 248/411 X |
| 2,570,365 | 10/1951 | Michael et al. | 403/384 X |
| 2,902,592 | 9/1959 | Cole et al. | 248/411 X |
| 3,349,418 | 10/1967 | Hein | 14/16.1 |
| 3,481,286 | 12/1969 | Mar et al. | 108/136 X |
| 3,675,597 | 7/1972 | Oddsen | 248/162.1 X |
| 3,741,514 | 6/1973 | Snurr | 248/412 |
| 3,880,097 | 4/1975 | Camilleri | 108/158 X |
| 4,111,389 | 9/1978 | Gundlach et al. | 248/162.1 |

FOREIGN PATENT DOCUMENTS

| | | | |
|---|---|---|---|
| 273047 | 6/1964 | Australia | 248/412 |
| 1138172 | 12/1968 | United Kingdom | 248/412 |

*Primary Examiner*—J. Franklin Foss
*Attorney, Agent, or Firm*—Arthur A. March

[57] ABSTRACT

Extensible support apparatus comprising a pair of telescoping members, e.g. hollow tubes preferably containing a substantially zero gradient biasing spring mechanism operatively interposed therebetween for counterbalancing forces exerted axially thereon, which in one form provides a vertically adjustable table support having tension hook elements operatively interconnecting under selective tension a top plate for carrying a table top thereon and the upper end of the upper telescoping member in abutting engagement with the underside of the top plate, which in an additional form provides a releasable locking mechanism operatively interposed between the telescoping members for releasably locking the members in any selective position of telescoping relation therebetween including a stationary cam control wear plate and a movable cam control shim arranged in substantially coplanar slidable and force and wear distributing relation thereto so as to permit the shim to be slidably contacted and moved by a control cam for releasably locking the members and in turn to permit the shim to distribute operatively the resultant cam force and wear correspondingly throughout the common coplanar slidable extent of the shim and wear plate, and which in a further form provides a releasable engagement mechanism at the inserted end of the inner telescoping member for operatively releasably engaging the internal wall of the outer telescoping member in any selective position of telescoping relation between the members, and an axially elongated coaxially guiding slide ring sealingly interposed between the members and attached to the internal wall of the outer member at the end thereof adjacent the inner member for coaxially guiding and maintaining the members in sealed sliding relation in any position of telescoping movement therebetween.

37 Claims, 7 Drawing Figures

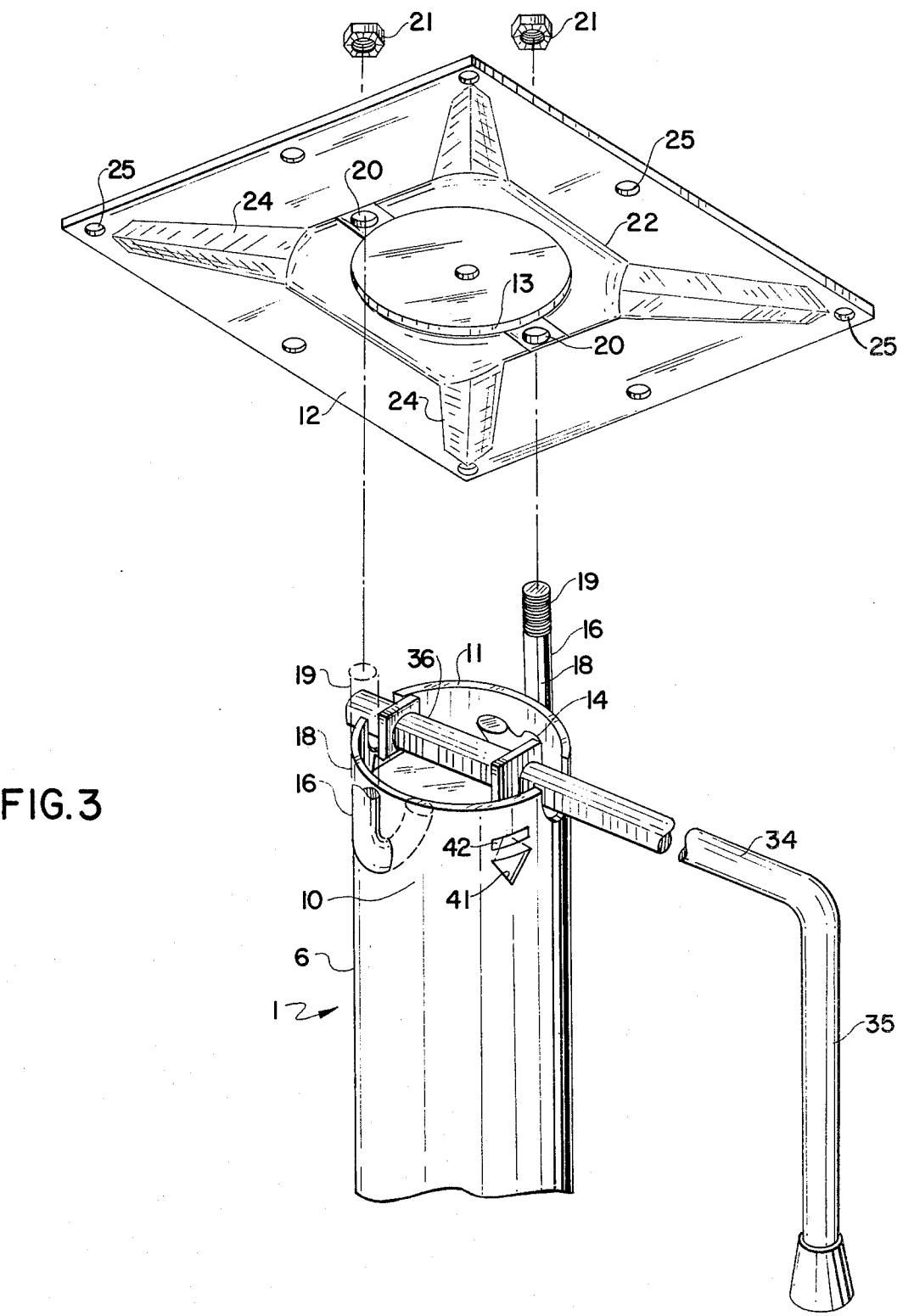

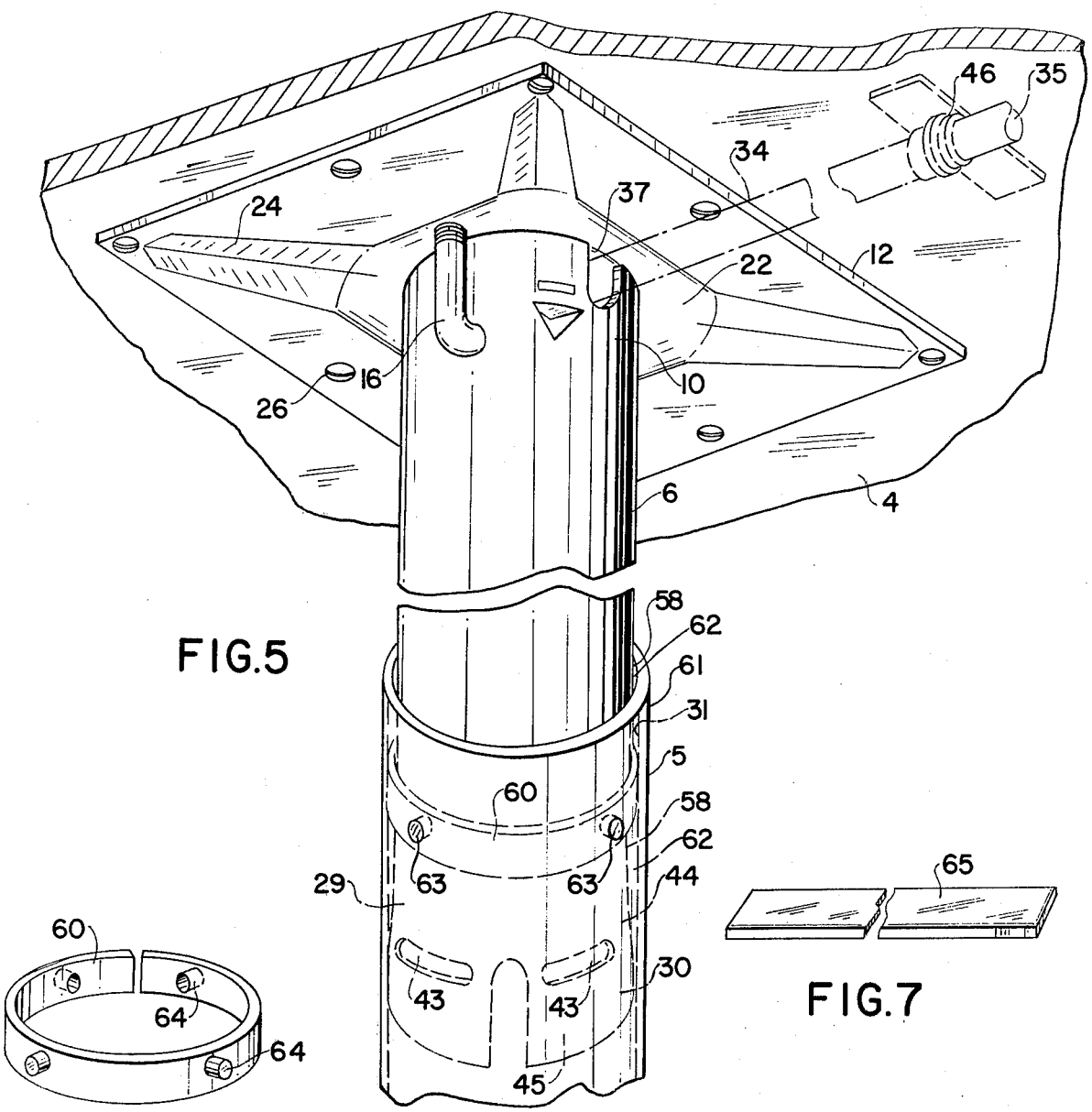
FIG.5
FIG.6
FIG.7
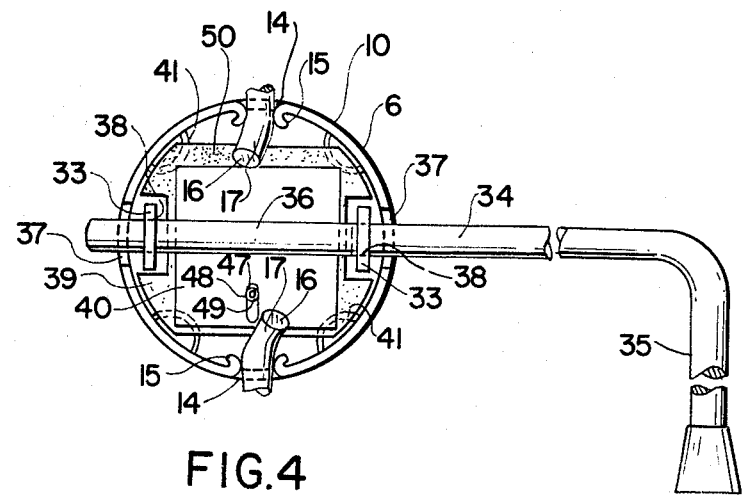
FIG.4

EXTENSIBLE SUPPORT APPARATUS

The present invention relates to extensible support apparatus, and more particularly to a pair of telescoping members having tension connection means for connecting a top plate adapted to carry a table top with one of the members under selective tension, additionally having releasable locking means for the members including a wear plate and a shim slidably arranged thereon and adapted to be slidably contacted and moved by a control cam for releasably locking the members, and furthermore having an axially elongated coaxially guiding slide ring sealingly interposed between the members, as the case may be.

Extensible support apparatus of various types are known. A distinctly advantageous development in this regard is disclosed in U.S. Pat. No. 3,675,597, issued July 11, 1972 to Oddsen, Oddsen and Edelson. Such patent, inter alia, concerns a vertical adjustable support for a table top utilizing a pair of telescoping members provided with a spring assembly to counterbalance the table top at any telescoping position of the members and a locking mechanism for interlocking the members in any such telescoping position. The locking mechanism includes a manual control cam rod inserted crosswise through the upper telescoping member so as to rotate against a stationary shim mounted on a wear plate horizontally arranged within the upper end of the upper member and thereby to operate a further cam system for interlocking the telescoping members against movement. The upper end of the upper tube is connected to the top plate for carrying the table top by conventional means and a conventional O-ring is seated at the inwardly tapered end of the outer member adjacent to the inserted end of the inner member to prevent separation of the telescoping members.

Other pertinent conventional constructions in this regard generally suffer from undue complexity and awkwardness of manipulation of the operating parts, high cost of materials and manufacturing steps, deficient structural integrity and durability in use, and the like.

It is among the objects and advantages of the present invention to overcome the various aforesaid prior art drawbacks and deficiencies, and to provide a safely usable extensible support apparatus having versatile and wide range constructional applicability.

It is among the additional objects and advantages of the present invention to provide an extensible support apparatus of the foregoing type, including a pair of telescoping members for use as a table support of adjustable height and having means for mounting a top plate, adapted to carry a table top thereon, in preferably selectively adjustable tension connection with the adjacent end portion of the upper telescoping member, especially in a manner permitting facile and economical manufacture and assembly of the coacting parts and utilization of readily available as well as uncomplicated and durable constructional components occupying minimum space in the overall apparatus.

It is among the further objects and advantages of the present invention to provide such an extensible support apparatus, including a pair of telescoping members for use as a table support of adjustable height as well as for other appropriate uses and having releasable locking means for selectively locking the members against telescoping movement, including means for distributing operatively force and wear on various parts to avoid premature wear and resultant play, and especially in a manner analogously permitting facile and economical manufacture and assembly of the coacting parts and utilization of readily available as well as uncomplicated and durable constructional components occupying minimum space in the overall apparatus.

It is among the still further objects and advantages of the present invention to provide such an extensible support apparatus, including a pair of telescoping members for use as a table support of adjustable height as well as for other appropriate uses and having means for coaxially guiding and maintaining the members in preferably sealed sliding relation in any position of telescoping movement therebetween, and especially as aforesaid in a manner permitting such facile and economical manufacture and assembly of the coacting parts and utilization of readily available as well as uncomplicated and durable constructional components occupying minimum space in the overall apparatus.

It is among the still further objects and advantages of the present invention to provide such apparatus in a manner permitting minimum modification of existing constructional parts, manufacturing and assembly steps and equipment to achieve the desired purposes, results and effects attendant the ultimate combination arrangements sought.

Other and further objects of the invention will become apparent from a study of the within specification and accompanying drawings, in which:

FIG. 3 is a schematic partially exploded perspective view of the upper portion of the apparatus of FIG. 1 showing the disposition of the various components thereat and especially the configuration of the underside of the top plate according to a preferred feature of the invention;

FIG. 4 is a schematic enlarged sectional top view taken along the line 4—4 of FIG. 2 which shows in greater detail the relation between the wear plate, slidable shim and control cam of the releasable locking means;

FIG. 5 is a schematic perspective view of the apparatus as seen from below the table top showing the manual control cam mounting arrangement, the disposition of the slide ring attached to the internal wall of the outer member, and the outwardly displaceable locking means at the inserted end of the inner telescoping member;

FIG. 6 is a schematic perspective view of one embodiment of the slide ring; and

FIG. 7 is a schematic perspective view of a precursor strip material prior to slide ring formation.

Figure 1:
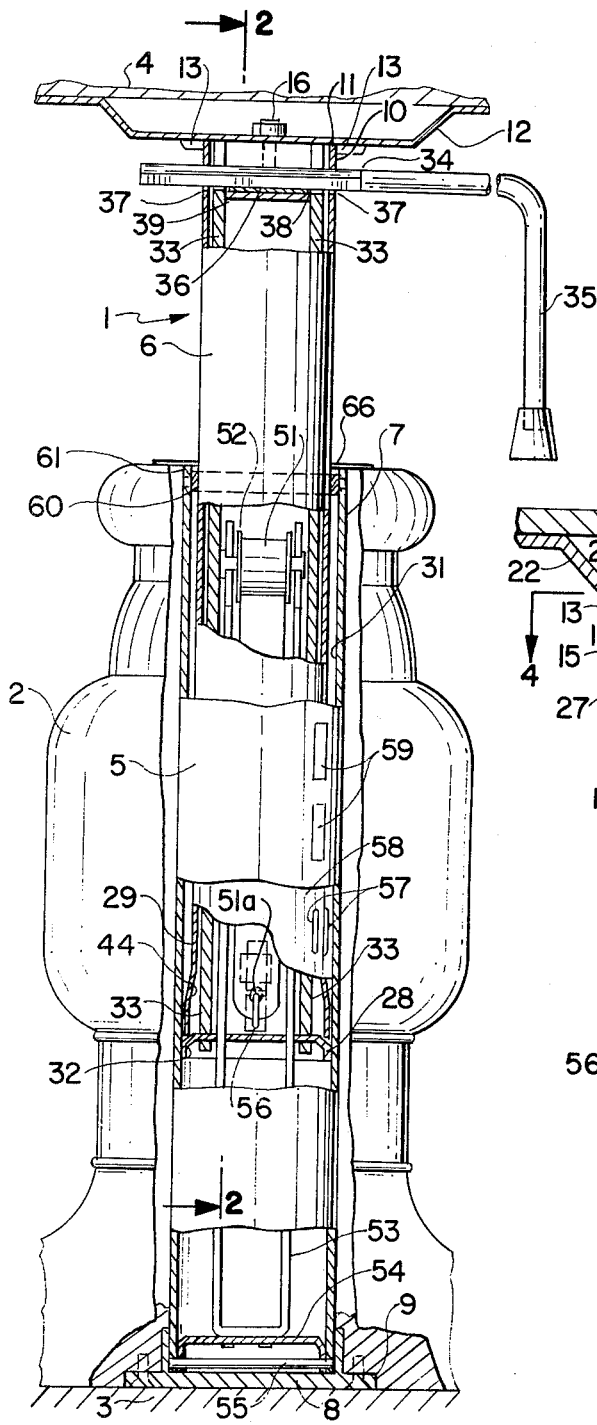
FIG. 1 is a schematic elevational view, partially in section, showing a vertical adjustable table support incorporating the extensible telescoping member apparatus according to one embodiment of the invention and the tension connecting means for mounting thereon a top plate for a table top to be carried thereby.

According to the present invention, an extensible support apparatus having versatile and wide range constructional applicability is provided which basically includes a pair of coacting outer and inner telescoping support members movable with respect to each other to change the extent of their telescoping relation and in turn their overall effective length or height as the case may be. The members are preferably in the form of hollow tubular members.

Thus, the apparatus may be constituted as a vertically adjustable table support apparatus, with the pair of telescoping members serving as table support members for changing the effective height of the table. In this instance, one of the telescoping members forms a lower vertical member adapted to transmit the load of the table to a support surface and the other of such members forms an upper vertical member having an upper end portion suitably arranged for abutting engagement with the underside of a top plate adapted to carry a table top thereon.

In accordance with one significant feature of the invention, hook seating means such as seating apertures are arranged on the upper end portion of the upper telescoping member, and tension hook means such as tension hook elements are arranged for operatively interconnecting under tension the hook seating means and the top plate whereby to maintain the upper end portion of the upper member in abutting engagement with the underside of the top plate. The tension hook means preferably include tension connection adjustment means to maintain such abutting engagement under selective tension.

More specifically, the tension hook means may include a corresponding shank portion, preferably arranged outwardly of the upper member, attached to the top plate and a corresponding hook portion in tension engagement with the hook seating means such as by insertion of the hook portion inwardly into the upper member through such a seating aperture. In this regard, the shank portion may contain a threaded end portion for insertion upwardly through an appropriate opening in the top plate and a lock nut may be provided to hold the threaded end portion in place. Such threaded end portion and lock nut advantageously provide a simple tension connection adjustment means for maintaining the upper end portion of the upper member in abutting engagement with the underside of the top plate under selective tension.

A desirably well-balanced tension connection system in this regard may be attained by suitably providing a pair of appropriately aligned diametrically opposed top plate openings, seating apertures and tension hook elements carrying lock nuts at their threaded end portions.

The apparatus may additionally be constituted as a support system for a table or otherwise, as the case may be, in which releasable locking means are operatively interposed between the telescoping members for releasably locking such members in any selective position of telescoping relation therebetween.

In accordance with an additional significant feature of the invention, in this regard, such releasable locking means may include a stationary cam control wear plate and a movable cam control shim or slide leaf arranged in substantially coplanar slidable as well as force and wear distributing relation with the wear plate. The shim is adapted to be slidably contacted and moved by a control cam such as a manually operated control cam for releasably locking the telescoping members and in turn the shim is further adapted to distribute operatively the resultant cam force and wear correspondingly throughout the common coplanar slidable extent of the shim and wear plate.

Desirably, a lubricant such as a grease, graphite powder, or the like, may be distributed between the shim and wear plate to minimize or reduce friction and wear thereat during slidable movement of the shim under the influence of the cam contact sliding force exerted thereagainst. Also, to facilitate assembly as well as limit relative sliding movement between the shim and wear plate while also preventing planar separation of these parts, the shim is desirably linkably attached to the wear plate. Resultant controlled relative slidable movement of the shim with respect to the wear plate via such linking attachment may be suitably effected by providing the shim with a linear slide slot and the wear plate with a retaining rivet or pin extending through the slot and having a retaining head engaging the margins of the slot.

The apparatus may furthermore be constituted as a support system for a table or otherwise, as the case may be, in which releasable engagement means or internal coaxially stabilizing guide means are arranged at the end portion of the inner member telescopingly disposed within the outer member for operatively releasably engaging or slidingly contacting the internal wall of the outer member in any selective position of telescoping relation between the members.

In accordance with a further significant feature of the invention, in this regard, an axially elongated coaxially guiding slide ring is preferably sealingly interposed between the telescoping members and attached to the internal wall of the outer member at the end portion thereof adjacent to the inner member. Such ring effectively coaxially guides and maintains the members in desirable sealed sliding relation in any position of telescoping movement therebetween, especially as supplemented and complemented by the conjoint internal coaxially stabilizing guiding action provided by the aforesaid releasable engagement means or guide means arranged at the inserted end portion of the inner member.

The slide ring thus occupies the inherent intermediate clearance gap between the members which enables the corresponding telescoping movement to be carried out without undue hinderance or binding. Suitably, the internal wall of the outer member and the external wall of the inner member are appropriately sized in width in this regard to provide such clearance gap along at least a substantial operative portion of their common telescoping extent. By extending into the path of the aforesaid releasable engagement means or guide means at the inserted end portion of the inner member, the ring additionally serves to retain the inner member captively within and outwardly limit movement thereof with respect to the outer member.

In particular, the ring may be provided in the form of a resilient plastic ring, preferably a split ring, such as by forming the same from a flat linear or elongated resilient plastic strip inwardly bended upon itself, permitting the ring to be arranged in preloaded outwardly urging confined disposition against the internal wall of the outer member under its own corresponding resilient force.

By suitably providing the internal wall of the outer member at the end portion thereof adjacent to the inner member with appropriately spaced apart internal engagement recesses therein, the ring may be readily attached thereto by correspondingly providing the same with spaced apart external hollow protuberances peripherally thereon. These may be especially formed in situ by locally peripherally outwardly pressing, e.g. by swaging or deforming via an appropriate conventional hydraulic tool or the like, corresponding portions of the ring into the internal engagement recesses in the internal wall of the outer member, whereby to accomplish attachment of the ring thereto.

In the most preferred instance, the internal wall of the outer member and the external wall of the inner member will be of substantially circular or round cross section so as to provide a corresponding substantially annular clearance gap therebetween whereupon the slide ring will be fabricated as a correspondingly complementally sized substantially annular ring.

In connection with all of the various embodiments of the invention, the telescoping members will generally be desirably provided with substantially zero gradient biasing spring means operatively interposed therebetween for counterbalancing the forces exerted on the system and for permitting adjustment of the effective overall length or height of the extensible support apparatus with minimum effort, e.g. upon release of the locking means or engagement means.

Referring to the drawings, and especially to FIG. 1, an extensible support apparatus 1 is shown which is conveniently usable as a vertically adjustable table column type support apparatus, being mounted via a base or ornamental hollow stand 2 on a support surface or floor 3 and arranged for carrying a table top 4 thereon.

The apparatus includes a pair of coacting outer and inner hollow tubular telescoping members 5 and 6 movable with respect to each other along their common longitudinal or vertical axis to change infinitely variably the extent of their telescoping relation and in turn their overall effective length and the corresponding height of the table.

Outer member 5 forms the lower vertical member and is slidably received, preferably in substantially snug fit, within the central receiving bore 7 of base 2 and is suitably fixedly attached thereto, for example via bottom plate 8 seated in base recess 9. Other attachment means may alternatively be used for this purpose as the artisan will appreciate. In this way, outer member 5 is able to transmit the operative load of the table to support surface 3.

Inner member 6, on the other hand, forms the upper vertical member and has an upper or outward end portion 10 terminating is a substantially squared off transverse end face 11, preferably lying in a plane normal to the common axis of the concentrically disposed members. Thus, end face 11 is arranged for abutting engagement with a flat portion of the underside of top plate 12, which carries table top 4 on the upper side thereof.

For proper seating alignment with end face 11, top plate 12 is provided with an outwardly limiting centering ridge 13 advantageously sized to abut the adjacent peripheral portion or corner edge of upper end portion 10 thereat and thereby keep the parts from undertaking any undesired radial or transverse displacement with respect to each other relative to the common axis of the members.

In accordance with a significant feature of the invention, hook seating means, suitably in the form of a pair of diametrically opposed hook seating apertures 14,14, are provided at the upper end portion 10 of inner or upper member 6. Seating apertures 14,14 are readily produced by a simple punching operation whereby to define the same in upper end portion 10. Upon inward punching, a smooth outer surface is maintained advantageously about the periphery of upper end portion 10 at each aperture 14 while a reinforcing guide 15 is preferably correspondingly produced along the inwardly deformed margins of each such aperture.

In conjunction therewith, tension hook means, desirably in the form of a corresponding pair of diametrically opposed tension connection hook elements or hooks 16,16, are provided for operatively interconnecting under constant tension the hook seating means, or seating apertures 14,14, and the top plate 12, whereby to maintain the upper end portion 10 of the inner or upper member 6 in abutting engagement with the underside of the top plate.

Each hook element 16 includes a lower hook portion 17, preferably inserted inwardly into the inner or upper member 6 through a corresponding seating aperture 14, and an upper shank portion 18, preferably arranged outwardly of the inner or upper member 6. Shank portion 18 contains a threaded end portion 19 inserted upwardly through a corresponding top plate opening 20 and is held thereat under selective tension by a corresponding lock nut or locking nut 21.

By suitable alignment of the pair of top plate openings 20,20 and seating apertures 14,14 in corresponding diametrically opposed disposition, the hook elements 16,16 will conveniently operatively interconnect the inner or upper member 6 via such seating apertures with the top plate 12 to maintain the upper end portion 10 in abutting engagement with the underside of top plate 12, all within the peripherally limiting confines of centering ridge 13 and under the constant selective tension of the corresponding lock nuts 21,21. Adjustment of lock nuts 21,21 along threaded end portions 19,19 may thus be carried out in a more or less infinitely variable manner for advantageously achieving optimally balanced tension interconnection as between the diametrically opposed connecting points at any selected tension force.

Significantly, by suitable selection of the resilient characteristics of the material, e.g. steel having an appropriate spring reserve, used to form the inner or upper member 6, especially where such reinforcing guides 15,15 are included along the margins of the seating apertures 14,14, the same will conveniently serve to contribute a certain amount of spring reserve at the seating apertures as well as along the axial portion extending therefrom to the end face 11 for advantageously preloading the tension connection provided by the hook elements 16,16 thereat in conjunction with the adjustable lock nuts 21,21 carried thereon. The hook elements 16,16 in turn may be made of similar resilient material. This use of resilient materials for these parts will inherently assure the constancy of the integrity of the desired tension hook connection, the inhibition of any loosening of the lock nuts and resultant play between the parts, and especially the accommodation of any variances in manufacturing tolerances of the dimensions of the interacting parts and any changes attendant normal expansion and contraction of such parts due to ambient temperature differences.

As the artisan will appreciate, the tension hook means and hook seating means may take any other appropriate form whereby to accomplish the selective constant tension interconnection of the parts. In this same regard, the shank portions of the tension hook elements may be arranged inwardly within the upper end portion of the inner or upper member such that the lower hook portions project outwardly through the seating apertures or are otherwise seated on the inner or upper member.

Moreover, a plurality of more than two such tension hook elements may be utilized to effect the desired interconnection of the parts along with an appropriate corresponding number of seating apertures or other hook seating means and top plate openings or the like to accommodate such tension hook means.

Of course, other types of adjustable tension connection means than lock nuts in engagement with hook element threads may similarly be provided for achieving the positive seating connection with the top plate as the artisan will appreciate.

In all such cases, advantageously the resulting apparatus will be safely usable for the desired purposes and will understandably possess versatile and wide range constructional applicability. The coacting parts in question are indeed appropriately designed in a manner which permits their facile and economical manufacture and assembly, and the utilization of readily available as well as uncomplicated and durable constructional components so to do. In essence, the finished parts in the assembly occupy a minimum of space in the overall apparatus and do not interfere with any other mechanisms which may also be desirably present therein.

In fact, it is clear that the upper member may alternatively constitute the outer member and the lower member in turn constitute the inner member for correspondingly appropriate results, with minimum reorientation of other parts in the overall assembly as may be necessary or desirable to accommodate complemental or supplemental functions and purposes, as the artisan will appreciate.

Top plate 12 is preferably conveniently provided with a slightly downwardly offset central portion 22 to form a head space 23 below the lower surface of the table top 4, in the vicinity of the exposed threaded end portions 19,19 and locking nuts 21,21 located on the upper side of the top plate. Hence, head space 23 accommodates the parts in question without the need for modifying the table top in any way.

Preferably, in conjunction with offset central portion 22, a plurality of radially or transversely extending slightly downwardly offset reinforcing rib portions 24 is similarly provided in top plate 12. These more or less cross wise rib portions 24 not only contribute lateral support to the central portion 22 but also transverse support for the top plate 12 itself, permitting the use of otherwise smaller or thinner dimensions for the top plate without sacrificing needed structural integrity for adequately carrying the table top 4 thereon.

Appropriate spaced apart attachment holes 25 are located in top plate 12 along the perimeter thereof through which screws, bolts or the like, 26 (FIG. 5), may be inserted for fixedly mounting table top 4 thereon. In the event of disassembly of the apparatus, for storage, shipping, removal and subsequent reassembly, or the like, such screws 26 may be readily removed and reinsertedly attached as the case may be for these purposes.

Moreover, in the unlikely instance that possible loosening or imbalance of the tension interconnection might occur, temporary removal of these screws 26 will permit access to lock nuts 21,21 for suitable readjustment to accomplish the desired purposes. In this regard, since the range of adjustment in any event will normally be small, the threaded end portions 19,19 of the hook elements 16,16 need only extend a minimum distance, e.g. one half inch, along the corresponding shank portions 18,18.

By utilizing hook elements having a lower hook portion 17 arranged at an angle of for instance about 40 degrees with respect to the normal axis of the upper shank portion 18, the reinforcing guide 15 at the inwardly punched margins of the corresponding seating aperture 14 will readily accommodate the inner curved contact portion 27 of the lower hook portion 17 thereat. At the same time these reinforcing guides 15,15 will advantageously exert an appropriate balancing counterforce at the inner curved contact portions 27,27 of the lower hook portions 17,17 with respect to the opposing selective constant tension force of the hook elements 16,16 held by the locking nuts 21,21 which act against the upper side of the top plate 12.

Releasable locking means 28 are suitably operatively interposed between members 5 and 6 for releasably locking the same in any selective position of telescoping relation therebetween. For this purpose, the inwardly inserted end portion 29 of the inner member 6 telescopingly within the outer member 5 is provided with releasable engagement means including a peripherally outwardly displaceable locking portion 30 for operatively releasably seating against the internal wall 31 of the outer member 5 therealong. In released disposition, locking portion 30 desirably forms an internal coaxial stabilizing guide in snug sliding contact with internal wall 31. To achieve locking disposition, upwardly liftable transverse cam element 32, preferably in the form of an inverted dishshaped plate, is disposed operatively within the outer element 5 below the open inserted end portion 29 of inner member 6 thereat and is connected for axially upward lifting to a pair of more or less parallel longitudinal pull rods 33,33 extending axially within inner member 6 to the upper end portion 10.

A rotatable control rod 34 having an outer manual handle 35 and a transverse inner central cam or noncylindrical portion 36 is inserted through diametrically opposed slot apertures 37,37 in the upper end portion 10 of inner member 6 as well as through confining circular journal apertures 38,38 at the upper ends of pull rods 33,33 in corresponding opposed alignment therewith, whereby to permit lifting of transverse cam element 32 into peripherally outwardly camming engagement with locking portion 30 as control rod 34 rotates.

Specifically, a wear plate 39 carrying a shim or slide leaf 40 is transversely disposed within the upper end portion 10 of inner member 6 and fixed in place by suitable supporting embossments 41 immediately therebelow in the adjacent wall portion of inner member 6. Similar yet less pronounced embossments 42 (FIG. 3) are provided immediately above wear plate 39 in such wall portion of inner member 6 to prevent undesired axial movement or play thereof within the upper end portion 10. Transverse inner control cam 36 of control rod 34 extends along the upper surface of shim 40 carried by wear plate 39 so as to permit the control cam to rotate or rock slidably against the shim to lift the pull rods 33,33 and in turn urge cam element 32 upwardly against the locking portion 30. This camming action causes locking portion 30 to be peripherally outwardly displaced into releasable seating engagement against the internal wall 31 thereat to lock the members 5 and 6 against telescoping movement.

Figure 2:
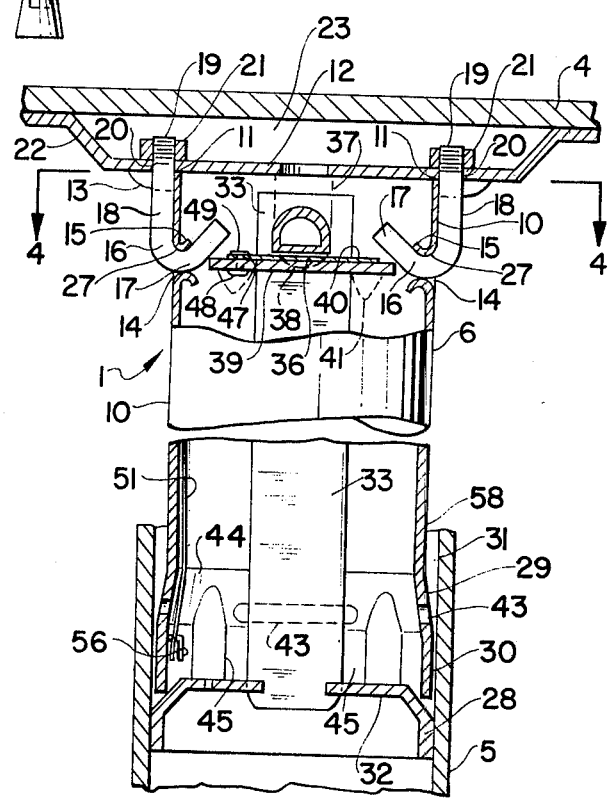
FIG. 2 is a schematic enlarged sectional view taken along the line 2—2 of FIG. 1 which shows in greater detail the positional relation between the tension connection means, the top plate and the upper telescoping member, as well as the disposition of the wear plate carrying the slidable shim thereon and the manner in which the control cam of the releasable locking means acts thereagainst.

Actually, control rod 34 is rotatably seated in circular journal apertures 38,38 to achieve precise relative movement between these parts when handle 35 is operated to turn the control rod. However, this entire mechanism is lifted to cause the desired lifting of pull rods 33,33 and cam element 32, by reason of the rocking and sliding engagement between the control cam 36 and the shim 40, as best seen in FIG. 2. The transitional portion between the flat underside portion of control cam 36 and the remaining rounded portion thereof provides a sufficient camming differential to effect the required lifting action as control rod 34 is rotated. Such transitional portion in sliding engagement with shim 40 efficiently rocks and lifts the entire control rod 34 on shim 40 and wear plate 39 and in turn locks the members together.

To aid in formation of the locking portion 30 and to enhance the peripherally outwardly displaceable action thereof for releasable seating engagement with the internal wall 31 of the outer member, the inserted end portion 29 of inner member 6 may be desirably provided with uniformly distributed transverse apertures 43 in the transitional outwardly flared portion 44 and correspondingly offset downwardly open slotted portions 45 therebelow (FIG. 2). Preferably, the inner member 6, as aforesaid, is provided of suitably resilient material, e.g. steel having a spring reserve characteristic, to permit effective outward displacement of locking portion 30 into releasable engagement with internal wall 31, and resilient self-return thereof slightly inwardly therefrom yet still in stabilizing guiding and sliding snug relation therewith upon release of cam element 32.

It will be noted that the transverse positioning of control rod 34 is sufficiently below the level of the interconnection between top plate 12 and the abutting portion of upper end portion 10 in engagement therewith to avoid any interference between these parts during operation of the control rod. To maintain control rod 34 in position and facilitate operative rotational alignment, a positioning journal mount 46 (FIG. 5) may be provided therefor suitably fixedly attached to the underside of table top 4.

As the artisan will appreciate, other appropriate means may be provided to accomplish the releasable locking of the members together to prevent telescoping movement therebetween, especially in terms of the internal connection between the concentric members, yet it is preferred that such system include the provision for a wear plate and shim mounting for the control cam used to operate such locking means.

In this regard, in accordance with an additional significant feature of the invention, as shown more clearly in FIG. 4, the shim 40 is movably arranged in substantially coplanar slidable as well as force and wear distributing relation to the wear plate 39 so as to be slidably contacted and moved by the control cam 36 as control rod 34 is rocked by handle 35. For this purpose, shim 40 is linkably attached to wear plate 39 for controlled slidable movement with respect thereto, such as by providing a linear slide slot 47 in shim 40 and a retaining rivet or pin 48 extending from wear plate 39 through the slot and having a retaining head 49 engaging the margins of the slot. In this way, the shim will be able to execute limited sliding movement relative to the wear plate corresponding to the linear extent of the slot while the rivet will appropriately maintain the shim in substantially coplanar relation to the wear plate.

The control cam 36 will thereby be able to control efficiently the releasable locking of the inner and outer members while the resultant cam force will in turn be distributed operatively correspondingly throughout the common coplanar slidable extent of the shim 40 and wear plate 39. This will advantageously distribute in turn the wear of the control cam and that of the shim experienced during the locking and releasing action of the mechanism.

As will be appreciated, since the control cam 36 is maintained in slidable contact with the shim 40 during back and forth rotation between a locking and a releasing position, thereby subjecting the shim to the forces exerted on the control rod 34 via the pull rods 33,33 acting on the cam element 32 serving to lift the locking portion 30 into engagement with the internal wall 31 of the outer member, these forces would normally cause excessive wear of the shim and soon cause the same to be scored and a groove to be worn therein. This would eventually lead to undesired play between the parts and pose a dangerous condition which might cause unexpected failure of the locking mechanism.

In contrast thereto, since the shim 40 slides back and forth against the wear plate 39 within the relatively wide limits of the slot 47 and rivet 48 in relation to each other, under the rotating sliding force of the control cam 36, such force and attendant wear are effectively distributed more or less evenly throughout the extent of the common contact between these sliding parts and thereby minimized. This sliding construction feature clearly prolongs the useful life and safety of the overall system.

For even greater effect, it is desirable to dispose a lubricant such as grease, graphite powder or the like, 50 (as schematically shown in FIG. 4), between the upper surface of wear plate 39 and the undersurface of shim 40. The presence of such a lubricant will reduce both friction and wear between these parts during sliding movement of the shim on the wear plate.

As may also be seen from FIG. 4, the lower hook portions 17,17 of the opposed tension hook elements 16,16 are appropriately dimensioned and positionable within the upper member 6 so as to be sufficiently offset with respect to shim 40 as to avoid interference with the desired sliding movement thereof on wear plate 39. This is particularly so where the lower hook portions 17,17 are disposed at an angle of about 40 degrees to the normal axis of the corresponding upper shank portions 18,18 of such hook elements. This assures adequate clearance between the lower hook portions and the shim. Hook elements 16,16 are of course also suitably offset 90 degrees with respect to control rod 34 and pull rods 33,33 to avoid interference between these various parts as well.

Hence, the wear plate and shim sliding arrangement provides means for distributing operatively all of the force and wear on the various coacting parts whereby to avoid premature scoring and wear as well as resultant play, especially in a manner permitting facile and economical manufacture and assembly of the coacting parts and utilization of readily available as well as uncomplicated and durable constructional components which occupy minimum space in the overall assembly.

If desired, the usual substantially zero gradient biasing spring means, such as in the form of one or more negator springs 51, e.g. in leaf spring stacked relation, may be included in the conventional manner for counterbalancing the table top and for permitting adjustment of the height of the table with minimum effort upon release of the locking means interconnecting the inner and outer members.

For this purpose, a spring wind up drum 52 is suitably journaled between the upper ends of the U-shaped stand 53 which is inserted into the remote end of the outer member 5 and fixed thereto via appropriate attachment to bottom cap 54 held in place by cross pin 55. Stand 53 and drum 52 are situated radially inwardly of pull rods 33,33 and by reason of suitable clearance thereat and clearance openings in cam elements 32, through which stand 53 extends, cam element 32 and pull rods 33,33 may ride along stand 53 without hinderance during telescoping movement of inner member 6 relative to outer member 5.

The free or downwardly extending end of the corresponding spring 51 contains an attachment aperture 51a for operatively mounting the same on a spring clip 56 provided on the interior of end portion 29. Hence, as inner member 6 moves inwardly into outer member 5, spring clip 56 carried thereby will unroll the spring or springs 51 from drum 52 while the latter remains held in stationary position by reason of the attachment of stand 53 to outer member 5. As inner member 6 moves in opposite direction, the spring or springs 51 will self-reroll onto drum 52.

This operation will occur when the locking means is released for adjustment of the telescoping relation between the members, as in adjusting the height of the table. However, since all these springs 51 are constituted as zero gradient springs, they will not exert any significant independent force to unwind or rewind themselves but instead will permit the telescoping system to remain in suspended dynamic balance or equilibrium in the conventional manner for ease in adjustment without danger despite the fact that the members are unlocked and subjected to the normal load of the table top thereon.

Generally, such negator springs 51 are sufficiently constituted in characteristics, and in combined number when a plurality thereof is used together, to counterbalance not only the load of the table but also a predetermined significant extra load resting thereon without change in the telescoping relation of the unlocked members, whereby to permit safe unlocking, repositioning adjustment of the telescoping parts with respect to each other, and relocking the same together for normal table use.

Optionally, to prevent relative rotation between the inner and outer members in any position of telescoping movement therebetween, appropriate outwardly directed embosses 57 on the external wall 58 of the inner member 6 along the inwardly inserted portion thereof and cooperating outwardly directed embosses 59 on the internal wall 31 of the outer member along the predominant extent thereof, may be provided in conventional manner for each of the embodiments contemplated. These embosses are arranged of course to permit unhindered axial displacement of the members for their normal intended operations.

In accordance with a further significant feature of the present invention, an axially elongated coaxially guiding slide ring 60 (FIGS. 5 and 6) is preferably sealingly interposed between the outer member 5 and inner member 6. Ring 60 is advantageously attached to the internal wall 31 of the outer member at the upper or outward end portion 61 thereof adjacent to the inner member. Thus, ring 60 coaxially guides and maintains the members in more or less sealed sliding relation along its extended axial length and in any position of telescoping movement between the members.

The internal wall 31 of the outer member 5 and the external wall 58 of the inner member 6 in opposed facing relation thereto are suitably selectively sized in width or diameter, i.e. in the portion thereof axially outwardly of the flared portion 44 of the inwardly inserted end 29 of the inner member, so as to provide an intermediate complemental transverse or radial clearance gap 62 therebetween. This gap 62 therefore conveniently extends along at least a substantial portion of the common telescoping extent of the members.

In this regard, the locking portion 30 on the inner member 6 advantageously serves as a releasable engagement means not only for operatively releasably engaging and seating against the internal wall 31 of the outer member 5 but also for stabilizing and guiding itself along such internal wall. Thus, locking portion 30 forms in released disposition an internal coaxially stabilizing guide in snug sliding contact with internal wall 31, especially at the inwardly inserted end of inner member 6, which is supplemental as well as complemental to the sliding guide constituted by ring 60, i.e. at the opposite axial end portion 61 of outer member 5.

Preferably, internal wall 31 is provided at end portion 61 with uniformly spaced apart internal engagement recesses 63 therein, e.g. formed by radially outwardly punching local areas of outer member 5 thereat, and ring 60 is provided with corresponding uniformly spaced apart external hollow transverse or radial protuberances 64 peripherally formed therein, whereby to seat the ring at such internal engagement recesses 63. These protuberances 64 may be effectively provided by forming the same in situ on the ring 60 such as by locally peripherally outwardly pressing, e.g. by a swaging or deforming operation with a suitable conventional hydraulic tool, corresponding portions of the ring into the recesses 63. The external protuberances are accordingly operatively received in the internal engagement recesses to attach the ring permanently onto the outer member.

Ring 60 is preferably provided as a resilient plastic ring, e.g. a split ring (FIG. 6), and may be formed from a precursor flat linear resilient strip 65, which has been cut to size, such as a nylon or other plastic strip (FIG. 7), of suitable reduced friction and high wear resistant surface characteristics, by inwardly bending the same, e.g. manually, upon itself. The split ring may be easily inserted in preloaded outwardly urging confined disposition against internal wall 31 under its own corresponding resilient force, e.g. in press fit manner.

The plastic material may be provided in the form of a roll strip or long flat strip of suitable width corresponding to the axial dimension of the ring and then cut to suitable circumferential length, or in the form of a flat blank of suitable width corresponding to the circumferential length of the desired ring and then cut to suitable width corresponding to the axial dimension of the ring, as the case may be.

It will be seen from FIGS. 1 and 5 that ring 60, being attached to outer member 5 and extending into the path of the locking portion 30 on the inwardly inserted end 29 of inner member 6, effectively captively retains the inner member within the outer member as well as outwardly limits the movement of the inner member with respect to the outer member, all without the need for specially inwardly tapering the insert end portion 61 of the outer member. Nevertheless, a cover plate 66 (FIG. 1) may be optimally provided at the upper end of base 2 to close off the system from the exterior thereat, if desired.

Accordingly, the slide ring feature of the present invention provides means for coaxially guiding and maintaining the members in preferably sealed sliding relation in any position of telescoping movement therebetween, and especially in a manner permitting facile and economical manufacture and assembly of the coacting parts and utilization of readily available as well as uncomplicated and durable constructional components, which occupy minimum space in the overall apparatus. In this instance also, the upper member may alternatively constitute the outer member and the lower member in turn may constitute the inner member for correspondingly appropriate results, with minimum reorientation of other parts in the overall assembly as may be necessary or desirable to accommodate complemental or supplemental functions and purposes, as the artisan will appreciate.

It will be noted that while the tubular members 5 and 6, ring 60, cover plate 66, centering ridge 13 in top plate 12, end face 11 on the upper end portion 10 of upper member 6, and the locking portion 30 and coacting cam element 32 will preferably be provided with corresponding complementally sized substantially circular and annular cross sections as the case may be, nevertheless other appropriate perimetric shapes for these various parts may also be utilized as desired, so long as the necessary features regarding the top plate tension connection, the telescoping guided movement of the members, the releasable locking thereof and the sliding sealing relation therebetween are all retained. Other uses for the extensible support apparatus of the invention besides its use as a table support, will of course readily occur to the artisan.

Generally, the various features of the present invention according to the foregoing permit their utilization in a manner necessitating only minimum modification of existing constructional parts, manufacturing and assembly steps and equipment, whereby to achieve the desired purposes, results and effects attendant the ultimate combination arrangements sought. A safely usable extensible support apparatus is thus provided having versatile and wide-range constructional applicability in terms of all of the significant features discussed.

It will be realized that the instant specification and drawings are set forth by way of illustration and not limitation, and that various modifications and changes may be made therein without departing from the spirit and scope of the present invention which is to be limited solely by the scope of the appended claims.

What is claimed is:

1. Extensible support apparatus comprising
a top plate having an upper side and an underside and adapted to carry a table top on the upper side thereof,
a pair of coacting telescoping support members movable with respect to each other to change the extent of their telescoping relation and in turn the effective height of the table, one of such members forming a lower vertical member adapted to transmit the load of the table to a support surface and the other of such members forming an upper vertical member having an upper end portion arranged for abutting engagement with the underside of the top plate,
releasable locking means operatively interposed between the members for releasably locking such members in any selective position of telescoping relation therebetween,
said releasable locking means including a stationary cam control wear plate and a movable cam control shim arranged in substantially coplanar slidable and force and wear distributing relation thereto and adapted to be slidably contacted and moved by a control ram for releasably locking the members and in turn to distribute operatively the resultant cam force and wear correspondingly throughout the common coplanar slidable extent of the shim and wear plate,
hook seating means arranged on the upper end portion of the upper member, and
tension hook means operatively interconnecting under tension the hook seating means and the top plate to maintain the upper end portion of the upper member in abutting engagement with the underside of the top plate.

2. Apparatus according to claim 1 wherein the tension hook means include tension connection adjustment means to maintain the upper end portion of the upper member in abutting engagement with the underside of the top plate under selective tension.

3. Apparatus according to claim 1 wherein the tension hook means include a corresponding shank portion attached to the top plate and a corresponding hook portion in tension engagement with the hook seating means.

4. Apparatus according to claim 3 wherein the corresponding shank portion contains a threaded portion provided with a lock nut and the top plate contains a corresponding plate opening therein, and the threaded portion of such shank portion is inserted upwardly through such plate opening and held by the lock nut thereat to maintain the upper end portion of the upper member in abutting engagement with the underside of the top plate under selective tension.

5. Apparatus according to claim 3 wherein the hook seating means include a corresponding seating aperture defined in the upper end portion of the upper member and the corresponding hook portion is inserted into the upper member through such seating aperture.

6. Apparatus according to claim 5 wherein the corresponding shank portion is arranged outwardly of the upper member and the corresponding hook portion is inserted inwardly into the upper member through such seating aperture.

7. Apparatus according to claim 1 wherein the hook seating means include a corresponding seating aperture defined in the upper end portion of the upper member, the top plate contains a corresponding plate opening therein, and the tension hook means include a corresponding hook portion inserted inwardly into the upper member through such seating aperture in tension engagement therewith and a corresponding shank portion arranged outwardly of the upper member and containing a threaded portion inserted upwardly through such plate opening and provided with a lock nut thereat to maintain the upper end portion of the upper member in abutting engagement with the underside of the top plate under selective tension.

8. Apparatus according to claim 1 wherein the hook seating means include a pair of opposed seating apertures defined in the upper end portion of the upper member, the top plate contains a pair of corresponding opposed top plate openings therein, and the tension hook means include a pair of opposed hook elements each having a hook portion inserted inwardly into the upper member through a corresponding said seating aperture in tension engagement therewith and a shank portion arranged outwardly of the upper member and containing a threaded portion inserted upwardly through a corresponding said top plate opening and provided with a lock nut thereat to maintain the upper end portion of the upper member in abutting engagement with the underside of the top plate under selective tension.

9. Apparatus according to claim 1 wherein a lubricant is disposed between the shim and wear plate to reduce friction and wear therebetween during slidable movement of the shim.

10. Apparatus according to claim 1 wherein one of the members is an outer telescoping member and the other of the members is an inner telescoping member, and a vertically elongated coaxially guiding slide ring is sealingly interposed between the telescoping members and attached to the outer member for coaxially guiding and maintaining the members in sealed sliding relation in any position of telescoping movement therebetween.

11. Apparatus according to claim 10 wherein the slide ring is provided with spaced apart external protuberances peripherally thereon, and the outer member is provided at the end portion thereof adjacent to the inner member with corresponding internal engagement recesses therein for operatively receiving such external protuberances to attach the slide ring thereto.

12. Apparatus according to claim 1 wherein the members are hollow tubular members, and substantially zero gradient biasing spring means for counterbalancing the table top are operatively interposed between the members to permit adjustment of the height of the table with minimum effort upon release of the locking means.

13. Extensible support apparatus comprising
   a top plate having an upper side and an underside and a pair of opposed top plate openings defined therein, said top plate being adapted to carry a table top on the upper side thereof,
   a pair of coacting outer and inner telescoping table support hollow tubular members movable with respect to each other to change the extent of their telescoping relation and in turn the effective height of the table, one of such members forming a lower vertical member adapted to transmit the load of the table to a support surface and the other of such members forming an upper vertical member having an upper end portion arranged for abutting engagement with the underside of the top plate and including a corresponding pair of opposed hook seating apertures defined therein,
   releasable locking means operatively interposed between the upper and lower members for releasably locking the members in any selective position of telescoping relation therebetween and including a stationary cam control wear plate situated in the upper end portion of the upper member and a movable cam control shim arranged in substantially coplanar slidable and force and wear distributing relation thereto and adapted to be slidably contacted and moved by a control cam for releasably locking the members and in turn to distribute operatively the resultant cam force and wear correspondingly throughout the common coplanar slidable extent of the shim and wear plate,
   substantially zero gradient biasing spring means for counterbalancing the table top operatively interposed between the members to permit adjustment of the height of the table with minimum effort upon release of the locking means,
   a vertically elongated coaxially guiding slide ring sealingly interposed between the telescoping members and attached to the interior of the outer member for coaxially guiding and maintaining the members in sealed sliding relation in any position of telescoping movement therebetween, and
   a pair of opposed tension connection hook elements, each having a lower hook portion inserted inwardly into the upper member through a corresponding said seating aperture and an upper shank portion arranged outwardly of the upper member and containing a threaded portion inserted upwardly through a corresponding said top plate opening and held under selective adjustable tension by a corresponding lock nut thereat, said hook elements operatively interconnecting the seating apertures and the top plate to maintain the upper end portion of the upper member in abutting engagement with the underside of the top plate under the selective tension of the corresponding lock nuts.

14. Apparatus according to claim 13 wherein a lubricant is disposed between the shim and wear plate to reduce friction and wear therebetween during slidable movement of the shim.

15. Apparatus according to claim 14 wherein the ring is provided with spaced apart external protuberances peripherally thereon and the outer member is provided at the end portion thereof adjacent to the inner member with corresponding internal engagement recesses therein for receiving such external protuberances to attach the ring thereto.

16. Extensible support apparatus comprising
   a pair of coacting telescoping support members movable with respect to each other to change the extent of their telescoping relation and in turn their overall effective length and
   releasable locking means operatively interposed between the members for releasably locking such members in any selective position of telescoping relation therebetween,
   said releasable locking means including a stationary cam control wear plate and a movable cam control shim arranged in substantially coplanar slidable and force and wear distributing relation thereto and adapted to be slidably contacted and moved by a control cam for releasably locking the members and in turn to distribute operatively the resultant cam force and wear correspondingly throughout the common coplanar slidable extent of the shim and wear plate.

17. Apparatus according to claim 16 wherein a lubricant is disposed between the shim and wear plate to reduce friction and wear therebetween during slidable movement of the shim.

18. Apparatus according to claim 16 wherein the shim is linkably attached to the wear plate for controlled relative slidable movement with respect thereto.

19. Apparatus according to claim 18 wherein the shim contains a linear slide slot therein and is attached to the wear plate by a retaining rivet extending from the wear plate through the slot and having a retaining head engaging the margins of the slot for permitting limited sliding movement of the shim relative to the wear plate corresponding to the linear extent of the slot while maintaining the shim in substantially coplanar relation to the wear plate.

20. Apparatus according to claim 16 wherein a control cam is provided for releasably locking the members, and such control cam is arranged in slidable contact with the shim for movement between a locking and a releasing position.

21. Apparatus according to claim 20 wherein the control cam includes a rotatable cam contact portion maintained in slidable contact with the shim for rotation back and forth between a locking and a releasing position and in turn for sliding the shim back and forth against the wear plate during such rotation.

22. Extensible support apparatus comprising
a pair of coacting outer and inner telescoping support members movable with respect to each other to change the extent of their telescoping relation and in turn their overall effective length, the outer member having an internal wall and the inner member having an external wall and such walls being sized in width to provide an intermediate clearance gap therebetween along at least a substantial portion of their common telescoping extent,
releasable locking means operatively interposed between the members for releasably locking such members in any selective position of telescoping relation therebetween,
said releasable locking means including a stationary cam control wear plate and a movable cam control shim arranged in substantially coplanar slidable and force and wear distributing relation thereto and adapted to be slidably contacted and moved by a control cam for releasably locking the members and in turn to distribute operatively the resultant cam force and wear correspondingly throughout the common coplanar slidable extent of the shim and wear plate,
said releasable locking means further including such control cam operatively arranged for slidable contact with the shim and operatively connected to releasable engagement means located at the end portion of the inner member telescopingly disposed within the outer member for operatively releasably engaging the internal wall of the outer member in any selective position of telescoping relation between the members in response to actuation of the control cam, and
an axially elongated coaxially guiding slide ring interposed between the members and attached to the internal wall of the outer member at the end portion thereof adjacent to the inner member for coaxially guiding and maintaining the members in sliding relation in any position of telescoping movement therebetween.

23. Apparatus according to claim 22 wherein the ring is provided with spaced apart external protuberances peripherally thereon, and the internal wall of the outer member is provided at the end portion thereof adjacent to the inner member with corresponding spaced apart internal engagement recesses therein for operatively receiving such external protuberances thereby to attach the ring thereto.

24. Apparatus according to claim 23 wherein the external protuberances are hollow protuberances formed in situ by locally peripherally outwardly pressing corresponding portions of the ring into the internal engagement recesses in the internal wall of the outer member.

25. Apparatus according to claim 24 wherein the ring is formed of plastic material.

26. Apparatus according to claim 25 wherein the internal wall of the outer member and the external wall of the inner member are substantially circular to cross section and provide a corresponding substantially annular gap therebetween, and the ring is a correspondingly complementally sized substantially annular ring.

27. Apparatus according to claim 22 wherein the ring is a resilient split ring arranged in outwardly urging confined disposition against the internal wall of the outer member.

28. Apparatus according to claim 27 wherein the ring is formed from a flat linear resilient strip inwardly bended upon itself and arranged in preloaded outwardly urging confined disposition against the internal wall of the outer member under its own corresponding resilient force.

29. Apparatus according to claim 28 wherein the ring is provided with spaced apart external protuberances peripherally thereon, and the internal wall of the outer member is provided at the end portion thereof adjacent to the inner member with corresponding spaced apart internal engagement recesses therein for operatively receiving such external protuberances thereby to attach the ring thereto.

30. Apparatus according to claim 27 wherein the external protuberances are hollow protuberances formed in situ by locally peripherally outwardly pressing corresponding portions of the ring into the internal engagement recesses in the internal wall of the outer member.

31. Apparatus according to claim 30 wherein the ring is formed of plastic material.

32. Apparatus according to claim 31 wherein the internal wall of the outer member and the external wall of the inner member are substantially circular in cross section and provide a corresponding substantially annular gap therebetween, and the ring is a correspondingly complementally sized substantially annular ring.

33. Apparatus according to claim 22 wherein the releasable engagement means include peripherally outwardly displaceable locking means on the end portion of the inner member telescopingly disposed within the outer member for operatively releasably seating against the internal wall of the outer member for releasably locking the members in any selective position of telescoping relation between the members.

34. Apparatus according to claim 22 wherein the ring is formed of plastic material.

35. Apparatus according to claim 22 wherein the internal wall of the outer member and the external wall of the inner member are substantially circular in cross section and provide a corresponding substantially annular gap therebetween and the ring is a correspondingly complementally sized substantially annular ring.

36. Extensible support apparatus according to claim 22 comprising
a pair of coacting outer and inner telescoping tubular support members movable with respect to each other to change the extent of their telescoping relation and in turn their overall effective length, the outer member having an internal wall and the inner member having an external wall and such walls being sized in width to provide an intermediate clearance gap therebetween along at least a substantial portion of their common telescoping extent,
releasable engagement means including peripherally outwardly displaceable locking means on the end portion of the inner member telescopingly disposed within the outer member for operatively releasably seating against the internal wall of the outer member for releasably locking the members in any selective position of telescoping relation between the members and in released disposition forming an internal coaxially stabilizing guide in sliding contact with the internal wall of the outer member, and an axially elongated coaxially guiding resilient plastic split slide ring sealingly interposed between the members and attached to the internal wall of the outer member at the end portion thereof adjacent to the inner member for coaxially guiding and maintaining the members in sealed sliding relation in any position of telescoping movement therebetween, said ring being formed from a flat linear resilient strip inwardly bended upon itself and arranged in preloaded outwardly urging confined disposition against the internal wall of the outer member under its own corresponding resilient force and said ring extending into the path of the locking means on the end portion of the inner member for captively retaining the inner member within and outwardly limiting movement thereof with respect to the outer member.

37. Apparatus according to claim 36 wherein the internal wall of the outer member is provided at the end portion thereof adjacent to the inner member with spaced apart internal engagement recesses therein and the ring is provided with corresponding spaced apart external hollow protuberances peripherally formed in situ thereon by locally peripherally outwardly pressing corresponding portions of the ring into the internal engagement recesses in the internal wall of the outer member for operatively receiving such external protuberances thereby to attach the ring thereto.

* * * * *